Patented June 18, 1935

2,005,320

UNITED STATES PATENT OFFICE 2,005,320

PROCESS OF PREPARING CHLORINATED RUBBERS

Erich Konrad and Fritz Schwerdtel, Leverkusen-I. G. Werk, Germany, assignors to I. G. Farbenindustrie Aktiengesellschaft, Frankfort-on-the-Main, Germany No Drawing. Application October 22, 1932, Serial No. 639,150. In Germany October 27, 1931

18 Claims. (Cl. 260—1)

The present invention relates to a process of preparing chlorinated rubbers from rubber latices and to the new chlorinated rubbers obtainable by said process.

When chlorinating rubber latices, chlorinated rubbers are obtained being insoluble or difficultly soluble in organic solvents. These products are, therefore, inoperable for the manufacture of varnishes and lacquers.

It is one object of the present invention to provide a process starting with rubber latices, but yielding chlorinated rubbers soluble in the organic solvents usually applied in the art of preparing lacquers and varnishes such as benzene, toluene, xylenes or other aromatic hydrocarbons, tetrachloromethane, acetic acid esters etc.

It is a further object of our invention to provide a process yielding chlorinated rubbers soluble in organic solvents in an especially simple and cheap manner.

The process of manufacture of the invention is as follows:—

Rubber latices (which may be of natural or synthetic origin) are subjected to an oxidizing reaction, suitable oxidizing agents are, for example, oxygen, gases containing oxygen and agents splitting off oxygen under the conditions of working such as air, ozone, hydrogen peroxide, benzoyl superoxide or other derivatives of hydrogen peroxide, chromium trioxide, sodium permanganate etc. The oxidizing reaction may be performed at any desired temperature, at which the rubber latices do not coagulate. Generally, the best results will be obtained at a temperature beween about 15 and about 90° C. Higher and lower temperatures are likewise operable in most cases. The time during which the oxidizing reaction should be continued varies within the widest limits, depending as well on the degree of solubility the chlorinated rubbers are desired to possess as on the more detailed methods of working. Generally speaking, the solubility of the chlorinated rubber is gradually increased the longer the oxidizing reaction is performed and/or the higher a temperature is applied. It should be mentioned that the time, at which the oxidation of the latices has proceeded far enough to yield after the chlorination process chlorinated rubbers sufficiently soluble in organic solvents, is a rather large one in case oxygen or ozone are applied as the oxidizing agents. For example, when performing the oxidation by means of air at a temperature of about 50° C. in the presence of an oxidizing catalyst, such as cobalt- or nickel nitrate or chloride or a mixture of these compounds, until one oxygen atom has combined with two isoprene molecules, oxidation will have proceeded far enough after about one to two days. Otherwise, when performing the reaction under the same conditions but at normal temperature, a time of about 12 to 14 days will be necessary for performing the oxidation process.

In case other oxidizing agents are used, it is possible to perform the oxidizing reaction in a rather short time. For example, when applying hydrogen peroxide, oxidation will have proceeded far enough within about ½ to 1 hour or even in less time at rather low temperatures.

As outlined above, oxidizing catalysts may be added to the reaction mixture. Such catalysts are, for example, salts (especially water soluble salts) of the metals of the eighth group of the periodical system, such as iron chloride, nickel chloride, nickel sulfate, nickel nitrate, cobalt chloride, cobalt nitrate or salts of the metals mentioned with higher unsaturated fatty acids, furthermore, salts of copper and manganese, such as copper sulfate and manganous sulfate, copper oleate, cobalt linoleate or other salts of metals of the type mentioned above with saturated or unsaturated higher fatty acids.

Obviously the type of the oxidizing catalysts has likewise a remarkable influence on the time of oxidation necessary to obtain reaction products yielding chlorinated rubbers of good solubility. It is therefore impossible to give definite ranges of time during which oxidation becomes complete. It is, however, to be pointed out that the best results are generally obtained when interrupting the oxidation as soon as or before one oxygen atom has entered into reaction with two molecules of the hydrocarbon, from which the rubber is derived.

After the oxidation chlorine is passed through the mixture at normal or lower or elevated temperature in the presence or absence of agents being capable of splitting off or of binding hydrochloric acid. The chlorinating reaction is accelerated by higher temperatures and the properties of the final products are dependent to some degree on the chlorinating temperature. Generally, we prefer to perform the chlorinating process at a temperature between about 15 and about 90° C. The chlorinating process is interrupted as soon as the desired quantity of chlorine has been taken up by the rubber molecules. In this manner it is possible to obtain chlorinated rubbers of any desired chlorine content, ranging, for example, from about 20% by weight up to about 70% by weight. The addition of emulsifying agents such as salts of alkylated naphthalene sulfonic acids, salts of diethylamino-ethoxyoleylanilide, salts of methyloleyltaurine etc. is of advantage before or during the chlorinating process in order to avoid coagulation of the latices.

When working in the above manner, the chlorinated rubbers are generally obtained in form of finely divided aqueous suspensions, from which they can easily be isolated by filtering and drying.

From the above it results that according to the present process chlorinated rubbers soluble in organic solvents can be obtained in a most simple and convenient manner, since it is unnecessary to apply any organic solvent neither in the oxidation nor in the chlorination step of the reaction. Furthermore, it is unnecessary to masticate the rubber before the chlorination as it is usual when chlorinating rubber in the presence of organic solvents. Finally, highly concentrated rubber latices can be subjected to the reactions in question and the working up and the isolating of the chlorinating products is remarkably simple and convenient.

Our new process is not limited to the oxidation and chlorination of rubber latices as they are obtained by tapping rubber trees. It can likewise be applied to the various latex concentrates of commerce, furthermore, to purified latices, which have been freed partly or totally from albuminous and resinous compounds, to agglomerated latices, and, finally, to artificial latices as are obtainable, for example, by polymerizing a butadiene hydrocarbon, such as butadiene or isoprene, in emulsion with water and of an emulsifying agent. Also the artificial latices obtainable by redispersing coagulated rubber in water according to known methods, may be subjected to our process with a good result.

Therefore, when applying the words "rubber latices" in the claims, the same is intended to include the various known types of latices as outlined above.

The following examples will illustrate the invention, without limiting it thereto, the parts being by weight:—

Example 1

100 parts of Hevea latex (conserved by means of ammonia and containing 36% of rubber) are mixed with 100 parts of a 10% aqueous solution of the sodium salt of dibutylnaphthalene sulfonic acid. Some drops of an aqueous cobalt nitrate solution are added and air or oxygen are bubbled through the mixture at about 40° C. for about 10 days. Chlorine is then introduced into the mixture at room temperature, until a chlorinated rubber of about 50% chlorine content is obtained. The mixture is then filtered and the residue washed and dried. A chlorinated rubber is thus obtained being easily soluble in organic solvents, for example, tetrahydronaphthalene.

Example 2

30 parts of a 25% aqueous solution of the sodium salt of dibutylnaphthalene sulfonic acid are added to 40 parts of a latex concentrate with 60% of rubber content. A current of oxygen containing 6% of ozone is then led through the mixture at room temperature and at a speed of 20 litres per hour. After 2 hours chlorine is introduced into the mixture at about 40° C., until a chlorinated rubber of 40–60% chlorine content is obtained, which is isolated by filtering and drying. A fine white powder is thus obtained, soluble for example, in benzene, tetrachloromethane and tetrahydronaphthalene.

Example 3

100 parts of a 20% aqueous solution of the sodium salt or another alkali metal salt of dibutylnaphthalene sulfonic acid and 10 parts of a 0.5% aqueous solution of cobalt nitrate and nickel nitrate (1:1) are added to 100 parts of a latex concentrate containing 60% of rubber. 200 parts of 3% hydrogen peroxide are then added and the mixture is heated on the water bath for a short time, until the foaming, which soon occurs, has ceased. After the chlorination and working up as described in Example 2, a loose powder is obtained being soluble in tetrahydronaphthalene and chloroform.

When applying a stronger hydrogen peroxide solution (for example, a 6% one) a chlorinated rubber being especially easily soluble in organic solvents with the formation of solutions of low viscosity is obtained.

Example 4

20 parts of latex (conserved with ammonia) are mixed with 200 parts of a 3% aqueous solution of the chlorohydrate of omega-diethylamino-ethoxy-oleyl-anilide previously neutralized with sodium bicarbonate. 100 parts of aqueous sulfuric acid are then caused to run in slowly and 50 parts of a 10% aqueous solution of Glauber's salt are added. According to this manner there is obtained a finely dispersed, stable latex agglomeration, which is oxidized by means of 50 parts of 5% hydrogen peroxide and chlorinated as described in the above examples.

After filtering and washing with water, a chlorinated rubber is obtained being soluble in the usual rubber solving solvents.

Chlorinated rubbers of similar properties are obtainable when replacing in the above examples the rubber latices by synthetic rubber latices as they are obtainable, for example, by polymerizing a butadiene hydrocarbon, such as butadiene, isoprene or 2.3-dimethylbutadiene while in emulsion with water and an emulsifying agent, such as soaps, salts of alkylated naphthalene sulfonic acids and so on.

We claim:—

1. The process of preparing chlorinated rubbers from rubber latices which comprises subjecting the rubber latices to an oxidizing reaction and then chlorinating the product.

2. The process of preparing chlorinated rubbers from rubber latices which comprises adding to the latices an oxidizing agent of the group consisting of oxygen, agents containing free oxygen and agents splitting off oxygen under the conditions of working, and keeping the reaction mixture at a temperature between about 15 and about 90° C., before about one atom of oxygen has entered the rubber molecule on two molecules of the hydrocarbon, from which the respective rubber is derived and then chlorinating the product.

3. The process of preparing chlorinated rubbers from rubber latices which comprises adding to natural rubber latex hydrogen peroxide and keeping the mixture at a temperature between about 15 and about 90° C., before about one oxygen atom has entered the rubber molecule on about two molecules of the isoprene, from which the rubber is derived and then chlorinating the product.

4. The process of preparing chlorinated rubbers from rubber latices which comprises adding to the latices an oxidizing catalyst, an oxidizing agent of the group consisting of oxygen, agents containing free oxygen and agents splitting off oxygen under the conditions of working, and keeping the reaction mixture at a temperature between about 15 and about 90° C., before about one atom of oxygen has entered the rubber molecule on two molecules of the hydrocarbon, from which the respective rubber is derived and then chlorinating the product.

5. The process of preparing chlorinated rubbers from rubber latices which comprises adding to natural rubber latex an oxidizing catalyst and hydrogen peroxide, and keeping the mixture at a temperature between about 15 and about 90° C., before about one oxygen atom has entered the rubber molecule on about two molecules of the isoprene, from which the rubber is derived and then chlorinating the product.

6. The process of preparing chlorinated rubbers from rubber latices which comprises adding to natural rubber latex an oxidizing catalyst of the group consisting of water soluble salts of metals of the eighth group of the periodical system, furthermore, hydrogen peroxide, and keeping the mixture at a temperature between about 15 and about 90° C., before about one oxygen atom has entered the rubber molecule on about two molecules of the isoprene, from which the rubber is derived and then chlorinating the product.

7. The process of preparing chlorinated rubbers from rubber latices which comprises adding to natural rubber latices a mixture of cobalt nitrate and nickel nitrate, and hydrogen peroxide, and keeping the mixture at a temperature between about 15 and about 90° C., before about one oxygen atom has entered the rubber molecule on about two molecules of the isoprene, from which the rubber is derived and then chlorinating the product.

8. The process which comprises subjecting rubber latices to an oxidizing reaction, and leading chlorine through the reaction mixture.

9. The process which comprises adding to natural rubber latex hydrogen peroxide and an oxidizing catalyst of the group consisting of water soluble salts of metals of the eighth group of the periodical system, keeping the mixture at a temperature between about 15 and about 90° C., before about one oxygen atom has entered the rubber molecule of the isoprene from which the rubber is derived, and leading chlorine through the reaction mixture.

10. The process of preparing chlorinated rubbers from rubber latices which comprises subjecting the rubber latices to an oxidizing reaction in the presence of an emulsifying agent and then chlorinating the product.

11. The process of preparing chlorinated rubbers from rubber latices which comprises adding to the latices an emulsifying agent and an oxidizing agent of the group consisting of oxygen, agents containing free oxygen and agents splitting off oxygen under the conditions of working, and keeping the reaction mixture at a temperature between about 15 and about 90° C., before about one atom of oxygen has entered the rubber molecule on two molecules of the hydrocarbon, from which the respective rubber is derived and then chlorinating the product.

12. The process of preparing chlorinated rubbers from rubber latices which comprises adding to natural rubber latex an emulsifying agent and hydrogen peroxide, and keeping the mixture at a temperature between about 15 and about 90° C., before about one oxygen atom has entered the rubber molecule on about two molecules of the isoprene, from which the rubber is derived and then chlorinating the product.

13. The process of preparing chlorinated rubbers from rubber latices which comprises adding to the latices an emulsifying agent and an oxidizing catalyst, an oxidizing agent of the group consisting of oxygen, agents containing free oxygen and agents splitting off oxygen under the conditions of working and keeping the reaction mixture at a temperature between about 15 and about 90° C., before about 1 atom of oxygen has entered the rubber molecule on 2 molecules of the hydrocarbon, from which the respective rubber is derived and then chlorinating the product.

14. The process of preparing chlorinated rubbers from rubber latices which comprises adding to natural rubber latex an emulsifying agent and an oxidizing catalyst and hydrogen peroxide, and keeping the mixture at a temperature between about 15 and about 90° C., before about 1 oxygen atom has entered the rubber molecule on about 2 molecules of the isoprene, from which the rubber is derived and then chlorinating the product.

15. The process of preparing chlorinated rubbers from rubber latices which comprises adding to natural rubber latex an emulsifying agent and an oxidizing catalyst of the group consisting of water soluble salts of metals of the eighth group of the periodical system, furthermore, hydrogen peroxide, and keeping the mixture at a temperature between about 15 and about 90° C., before about 1 oxygen atom has entered the rubber molecule on about 2 molecules of the isoprene, from which the rubber is derived and then chlorinating the product.

16. The process of preparing chlorinated rubbers from rubber latices which comprises adding to natural rubber latices an emulsifying agent and a mixture of cobalt nitrate and nickel nitrate, furthermore, hydrogen peroxide, and keeping the mixture at a temperature between about 15 and about 90° C., before about 1 oxygen atom has entered the rubber molecule on about 2 molecules of the isoprene, from which the rubber is derived and then chlorinating the product.

17. The process which comprises subjecting rubber latices to an oxidizing reaction in the presence of an emulsifying agent and leading chlorine through the reaction mixture.

18. The process which comprises adding to natural rubber latex an emulsifying agent, hydrogen peroxide and an oxidizing catalyst of the group consisting of water soluble salts of metals of the eighth group of the periodical system keeping the mixture at a temperature between about 15 and about 90° C., before about one oxygen atom has entered the rubber molecule of the isoprene from which the rubber is derived, and leading chlorine through the reaction mixture.

ERICH KONRAD.
FRITZ SCHWERDTEL.